US009381598B2

(12) United States Patent
Kenworthy

(10) Patent No.: US 9,381,598 B2
(45) Date of Patent: Jul. 5, 2016

(54) PRODUCTION WASHING ASSEMBLY VERIFICATION SYSTEM AND METHOD

(71) Applicant: GM GLOBAL TECHNOLOGY OPERATIONS LLC, Detroit, MI (US)

(72) Inventor: Matthew Kenworthy, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 14/486,465

(22) Filed: Sep. 15, 2014

(65) Prior Publication Data

US 2015/0000128 A1    Jan. 1, 2015

Related U.S. Application Data

(62) Division of application No. 13/092,179, filed on Apr. 22, 2011, now Pat. No. 8,871,034.

(60) Provisional application No. 61/442,842, filed on Feb. 15, 2011.

(51) Int. Cl.
*B23P 15/10*     (2006.01)
*B08B 3/02*      (2006.01)

(52) U.S. Cl.
CPC . *B23P 15/10* (2013.01); *B08B 3/02* (2013.01); *Y10T 29/49233* (2015.01)

(58) Field of Classification Search
None
See application file for complete search history.

(56) References Cited

U.S. PATENT DOCUMENTS 2,972,995 A * 2/1961 Dewey ..................... C23G 3/00
                                                                                   134/129
4,324,127 A * 4/1982 Gazzara .............. G01F 25/0053
                                                                                   73/1.22

FOREIGN PATENT DOCUMENTS

JP          2001157863 A  *  6/2001

OTHER PUBLICATIONS

English Machine Translation of JP 2001-157863.*

* cited by examiner

*Primary Examiner* — Nicole Blan
(74) *Attorney, Agent, or Firm* — Quinn Law Group, PLLC

(57) ABSTRACT

A master verification assembly includes a plurality of plunger devices. Each of the plunger devices includes a piston that is axially moveable between a raised position and a depressed position. When placed in a washing assembly, each of the plunger devices is aligned with a nozzle. The nozzles dispense a cleaning fluid under pressure. An axial force applied by the dispensed cleaning fluid depresses the pistons into the depressed position, whereupon the pistons disposed in the depressed position are axially secured in an indicator position. Upon removal of the master verification assembly from the washing assembly, depressed pistons in the indicator position indicate proper function of the nozzles, whereas pistons disposed in the raised position indicate improperly functioning nozzles.

13 Claims, 5 Drawing Sheets

PRODUCTION WASHING ASSEMBLY VERIFICATION SYSTEM AND METHOD

CROSS-REFERENCE TO RELATED APPLICATIONS

This application is a divisional patent application of U.S. patent application Ser. No. 13/092,179, filed on Apr. 22, 2011, which claims the benefit of U.S. Provisional Patent Application Ser. No. 61/442,842, filed on Feb. 15, 2011.

TECHNICAL FIELD

The disclosure generally relates to a method of verifying proper functionality of a part washing system for washing parts along a production line, and a master verification tool therefore.

BACKGROUND

Mass production of various items of manufacture, such as but not limited to internal combustion engines for example, require that the individual components thereof be washed to clean any debris, dirt and/or grease therefrom. The individual parts may be positioned in a part washing system for cleaning. The part washing system may include a plurality of nozzles that each dispense a cleaning fluid under pressure onto the part, or may alternatively include a single washing nozzle that is manipulated around the part to wash several different locations on the part. Many of the parts, such as but not limited to engine blocks, cylinder heads, intake manifolds, etc., include small ports and/or passages that must also be cleaned. In order to clean these ports, a nozzle is aligned with each individual port to inject cleaning fluid directly into the port at a given pressure. If the nozzle becomes clogged, misaligned, or otherwise fails to properly direct the cleaning fluid into the port at the given pressure, the port may not be properly cleaned. It is therefore important to be able to verify that each and every nozzle of the part washing system is properly aligned, and providing the cleaning fluid to the part at the appropriate pressure.

SUMMARY

A part washing system for washing parts is provided. The part washing system includes a washer assembly. The washer assembly includes a nozzle. The nozzle is configured for dispensing a stream of a cleaning fluid under pressure along a nozzle axis. The part washing system further includes a master verification assembly. The master verification assembly includes a plunger device. The plunger device is disposed opposite the nozzle of the washer assembly. The plunger device includes a housing that defines a central bore. The central bore extends along a longitudinal axis. A piston is disposed within the central bore. The piston is moveable along the longitudinal axis between a raised position and a depressed position. The piston is moveable from the raised position into the depressed position in response to an axial force having a magnitude greater than a pre-defined value. The axial force is applied by the stream of the cleaning fluid from the nozzle along the longitudinal axis. Each of the plunger devices further includes a latch. The latch is configured for securing the piston in an indicator position upon the piston moving into the depressed position.

A master verification assembly for testing the functionality of a washing assembly of a part washing system is also provided. The master verification assembly includes a body that defines a plurality of apertures. Each of the apertures is configured to align axially with a stream of a cleaning fluid dispensed from a nozzle of the washer assembly. The master verification assembly further includes a plurality of plunger devices. One of the plunger devices is disposed within each of the apertures. Each of the plunger devices includes a housing. The housing defines a central bore that extends along a longitudinal axis. A piston is disposed within the central bore. The piston is moveable along the longitudinal axis between a raised position and a depressed position. The piston is moveable from the raised position into the depressed position in response to an axial force having a magnitude greater than a pre-defined value. Each of the plunger devices further includes a latch. The latch is configured for securing the piston in an indicator position upon the piston moving into the depressed position.

A method of verifying proper functionality of a washing assembly of a part washing system for washing parts along a production line is also provided. The method includes positioning a master verification assembly within the washer assembly such that each of a plurality of nozzles in the washer assembly align with one of a plurality of plunger devices disposed on the master verification assembly. A cleaning fluid is dispensed under pressure through each of the nozzles. Each of the plunger devices include a piston that is moveable from a raised position into a depressed position in response to an axial force having a magnitude greater than a pre-defined value applied by the dispensed cleaning fluid onto the piston. The method further includes securing each of the pistons moved into the depressed position by the dispensed cleaning fluid in an indicator position. The indicator position is depressed from the raised position. A position of each of the pistons is sensed to determine if the piston is disposed in the raised position or in the indicator position. Each piston determined to be in the indicator position indicates that the nozzle associated with that piston is properly aligned and dispensing cleaning fluid at a proper pressure. Each piston determined to be in the raised position indicates that the nozzle associated with that piston is not properly aligned with the piston or is not dispensing the cleaning fluid at the proper pressure.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
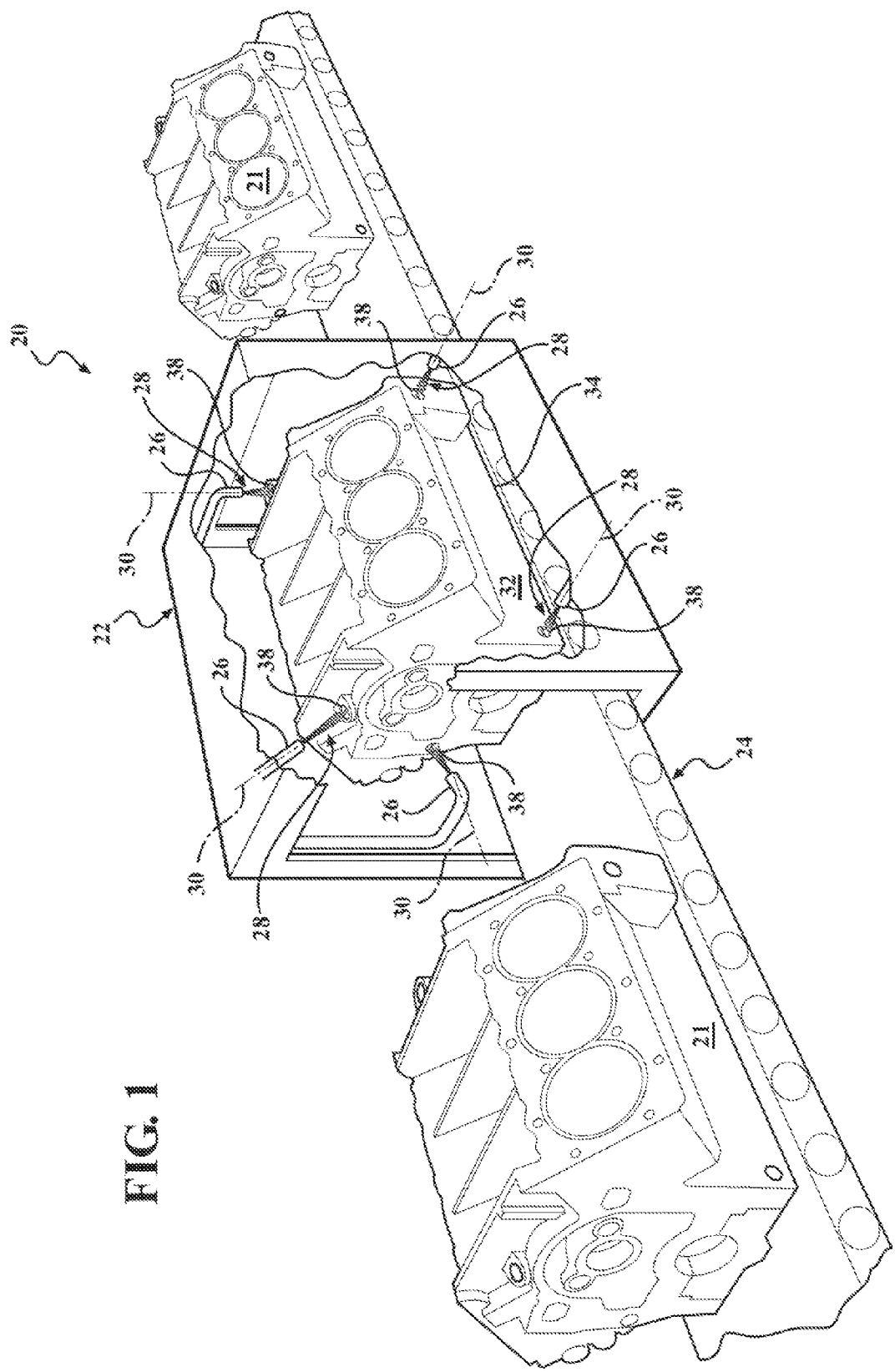
FIG. 1 is a schematic plan view of a part washing system.

Referring to the Figures, wherein like numerals indicate like parts throughout the several views, a part washing system is generally shown at 20 in FIG. 1. The part washing system 20 washes parts 21 along a production line. The parts 21 may include any parts that must be free of grease, oil, dirt and/or debris prior to assembly, including but not limited to engine blocks, cylinder heads, intake manifolds, etc.

Referring to FIG. 1, the part washing system 20 includes a washing assembly 22. The washing assembly 22 is preferably disposed along a production/assembly line. As shown in FIG. 1, the production/assembly line may include a conveyor system 24 that is coupled to the washing assembly 22 to continuously feed the parts 21 to the washing assembly 22. The washing assembly 22 includes a plurality of nozzles 26. Each of the nozzles 26 dispenses a stream of a cleaning fluid 28 under pressure along a nozzle axis 30. Each of the nozzles 26 is oriented within the washing assembly 22 to direct the stream of the cleaning fluid 28 therefrom onto a specific location of the part 21. For example, specific ports and/or passages within the part 21 may require direct spray therein to flush any debris, oil and/or grease from the port. As such, the position of the part within the washing assembly 22 is indexed relative to the washing assembly 22 to ensure that each part 21 is consistently positioned in the same location relative to the nozzles 26 so that each stream of the cleaning fluid 28 from each nozzle 26 is consistently directed to the appropriate location on the part 21.

While the part washing system 20 is shown in FIG. 1 and described herein as including the conveyor system 24, it should be appreciated that the production/assembly line may include some other system configured for moving the parts 21 to the washing assembly 22, or between multiple washing assemblies 22. For example, the production/assembly line may include a transfer bar that lifts the part 21, moves the part 21 to the washing assembly 22, and places the part 21 in a nest within the washing assembly 22. This type of system may include several different washing assemblies 22 that each target a different area of the part 21, with multiple transfer bars to move the part 21 between the several different washing assemblies 22. Alternatively, a robotic arm may be used to grip the part 21, and present the part 21 to a series of nozzles 26. In yet another alternative, a robotic arm may include a nozzle 26 attached thereto, and move the nozzle 26 to various positions about the part 21.

In order to verify proper functionality of the washing assembly 22, the part washing system 20 may include a master verification assembly 32 for testing the fluid pressure and the orientation of each stream of the cleaning fluid 28 from each nozzle 26. The master verification assembly 32 includes a body 34 defining a plurality of apertures 36. Each of the apertures 36 is axially aligned with the stream of the cleaning fluid 28 dispensed from one of the plurality of nozzles 26 of the washer assembly 22. Preferably, the master verification assembly 32 is manufactured from an actual part 21 to be washed. For example, if the part washing system 20 is configured for washing engine blocks, then the body 34 of the master verification assembly 32 would be manufactured from one of the engine blocks to be washed.

Figure 2:
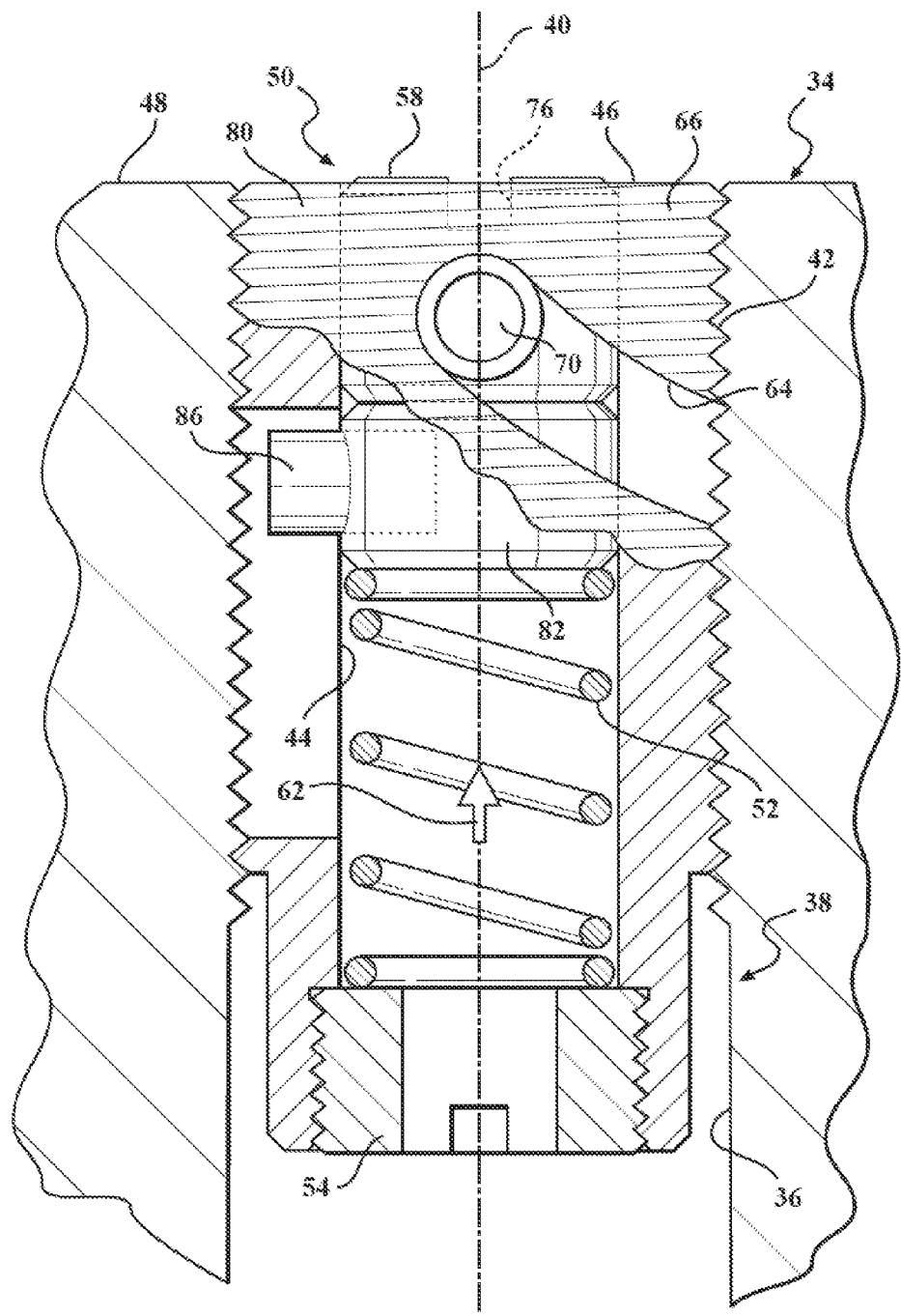
FIG. 2 is a schematic cross sectional view of the plunger device in the raised position.
Figure 3:
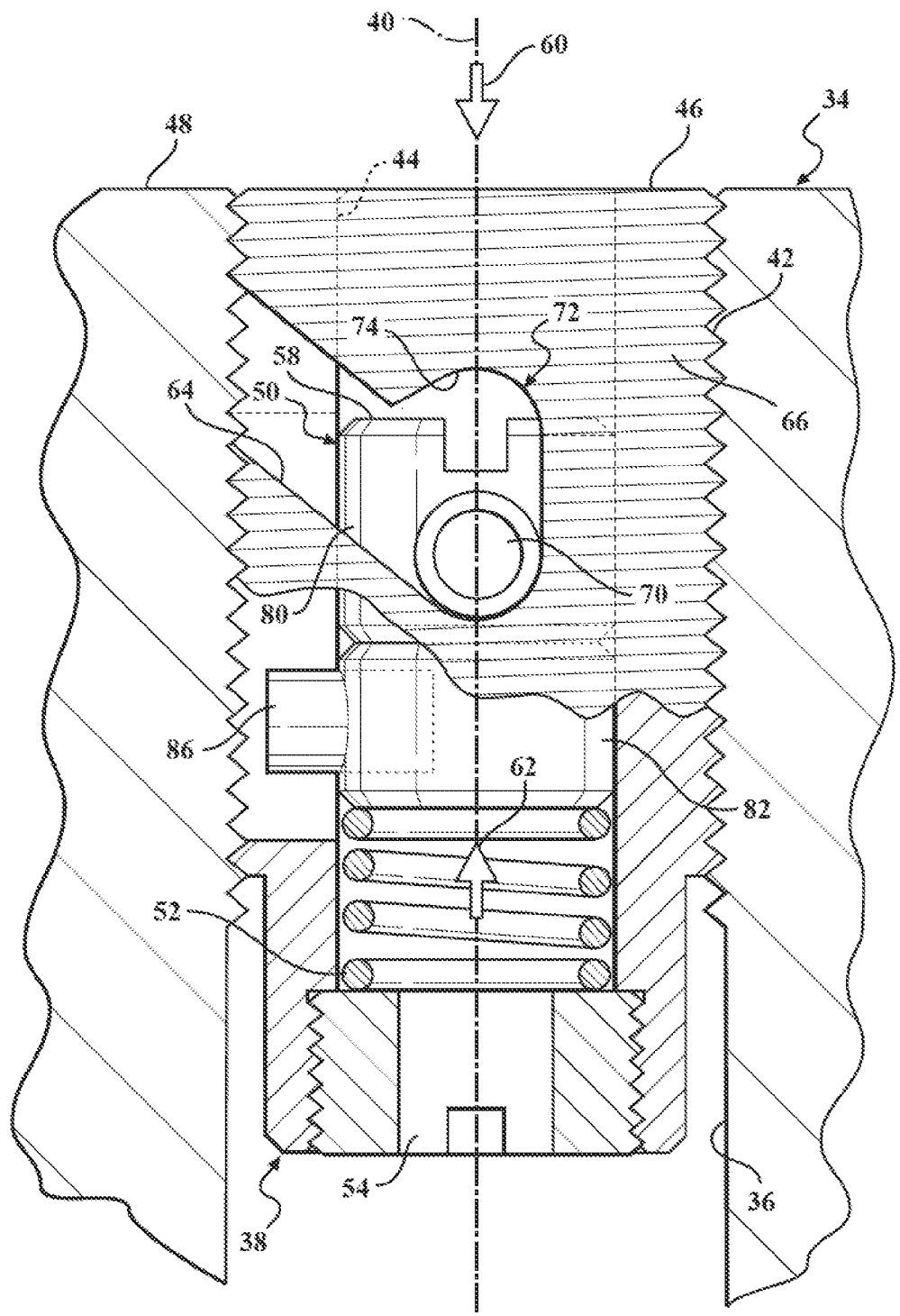
FIG. 3 is a schematic cross sectional view of the plunger device in a depressed position.
Figure 4:
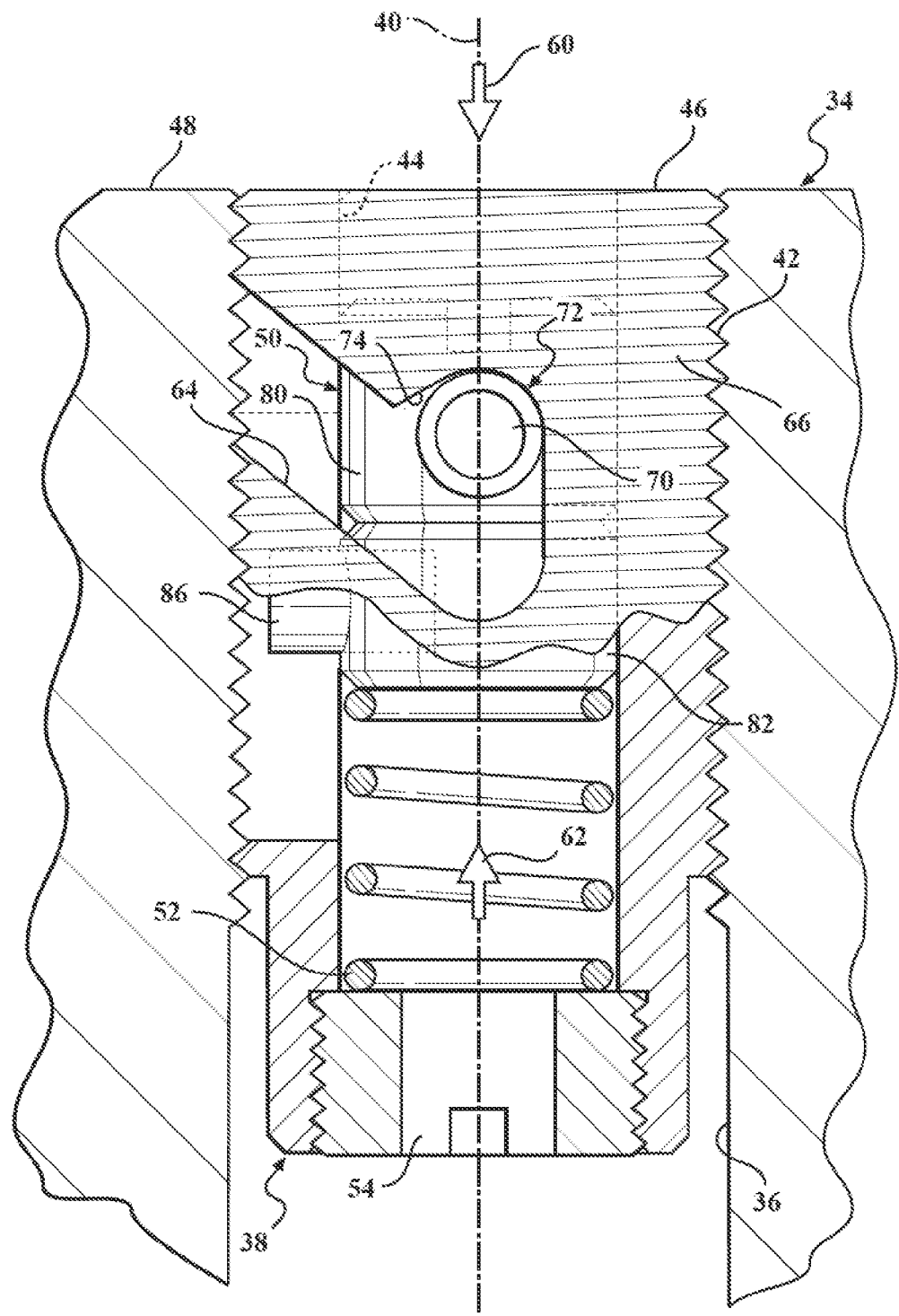
FIG. 4 is a schematic cross sectional view of the plunger device in the indicator position.

The master verification assembly 32 includes a plurality of plunger devices 38. One of the plunger devices 38 is disposed within each of the apertures 36. Referring to FIGS. 2 through 4, each of the plunger devices 38 is disposed opposite one of the nozzles 26, and extends along a longitudinal axis 40, which may be coaxially aligned with the nozzle axis 30 of one of the nozzles 26 of the washer assembly. However, it should be appreciated that the longitudinal axis 40 need not be coaxially aligned with the nozzle axis 30. Each of the plunger devices 38 includes a housing 42. The housing 42 of each of the plunger devices 38, and each of the apertures 36, define corresponding threads, with each of the plunger devices 38 disposed in threaded engagement with the threaded apertures 36 of the body 34.

The housing 42 of each of the plunger devices 38 defines a central bore 44 and a top surface 46. The central bore 44 extends along the longitudinal axis 40, and is disposed approximately perpendicularly relative to the top surface 46 of the housing 42. The top surface 46 of the housing 42 is disposed flush with an outer surface 48 of the body 34.

Each plunger device 38 further includes a piston 50. The piston 50 is disposed within the central bore 44. The piston 50 is moveable along the longitudinal axis 40 between a raised position, shown in FIG. 2, and a depressed position, shown in FIG. 3. A biasing device 52 is disposed within the central bore 44, and biases the piston 50 along the longitudinal axis 40 into the raised position. As shown, the biasing device 52 includes a coil spring. However, it should be appreciated that the biasing device 52 may include some other device capable of axially biasing the piston 50.

The plunger device 38 includes a base 54 that is removeably secured to the housing 42. The base 54 may be secured to the housing 42 in any suitable manner, such as but not limited to being secured to the housing 42 with fasteners, or being secured to the housing 42 through a threaded connection between the base 54 and the housing 42. The base 54 secures the biasing device 52 and the piston 50 within the central bore 44 of the housing 42 adjacent a lower or bottom end of the housing 42.

The piston 50 is moveable from the raised position into the depressed position in response to an axial force, generally indicated by arrow 60 in FIG. 3, having a magnitude greater than a pre-defined value. The axial force 60 is applied by the stream of the cleaning fluid 28 from one of the nozzles 26 along the longitudinal axis 40. As shown in FIG. 3, the axial force 60 is applied in a downward direction, with the piston 50 also moving in a downward direction when moving from the raised position into the depressed position. However, it should be appreciated that the direction of movement of the piston 50 is dependent upon the orientation of the plunger device 38.

The biasing device 52 provides a biasing force, generally indicated by arrow 62. Accordingly, the biasing force 62 from the biasing device 52 provides the resistance against the axial force 60 from the stream of the cleaning fluid 28. If the axial force 60 is greater than the biasing force 62, then the axial force 60 from the stream of the cleaning fluid 28 will compress the biasing device 52 and move the piston 50 from the raised position into the depressed position. If the axial force 60 is equal to or less than the biasing force 62 from the biasing device 52, then the axial force 60 from the stream of the cleaning fluid 28 will not compress the biasing device 52, and the piston 50 remains in the raised position. Therefore, it should be appreciated that the force required to compress the biasing device 52 and move the piston 50 from the raised position into the depressed position may be altered by replacing the biasing device 52 with a new biasing device 52 having a different spring constant.

The housing 42 of each of the plunger devices 38 defines a cam slot 64. The cam slot 64 extends through an outer wall 66 of the housing 42, and is open to the central bore 44. The cam slot 64 extends a distance along the longitudinal axis 40, while simultaneously rotating angularly about the longitudinal axis 40 to define a spiral shaped cam slot 64.

As shown, the piston 50 includes a first segment 80 and a second segment 82. The first segment 80 and the second segment 82 are disposed adjacent each other, with the first segment 80 disposed adjacent the top surface 46 of the housing 42, and the second segment 82 disposed between the biasing device 52 and the first segment 80. The first segment 80 is rotatable about the longitudinal axis 40 relative to the second segment 82.

The first segment 80 includes a post 70. The post 70 extends from the first segment 80 radially outward away from the longitudinal axis 40, and into the cam slot 64. The cam slot 64 guides the post 70 to rotate the first segment 80 as the piston 50 moves between the raised position and the depressed position. Accordingly, the axial force 60 from the stream of the cleaning fluid 28 moves the piston 50, including both the first segment 80 and the second segment 82, longitudinally along the longitudinal axis 40, while the interaction between the cam slot 64 and the post 70 rotates the first segment 80 about the longitudinal axis 40.

Figure 5:
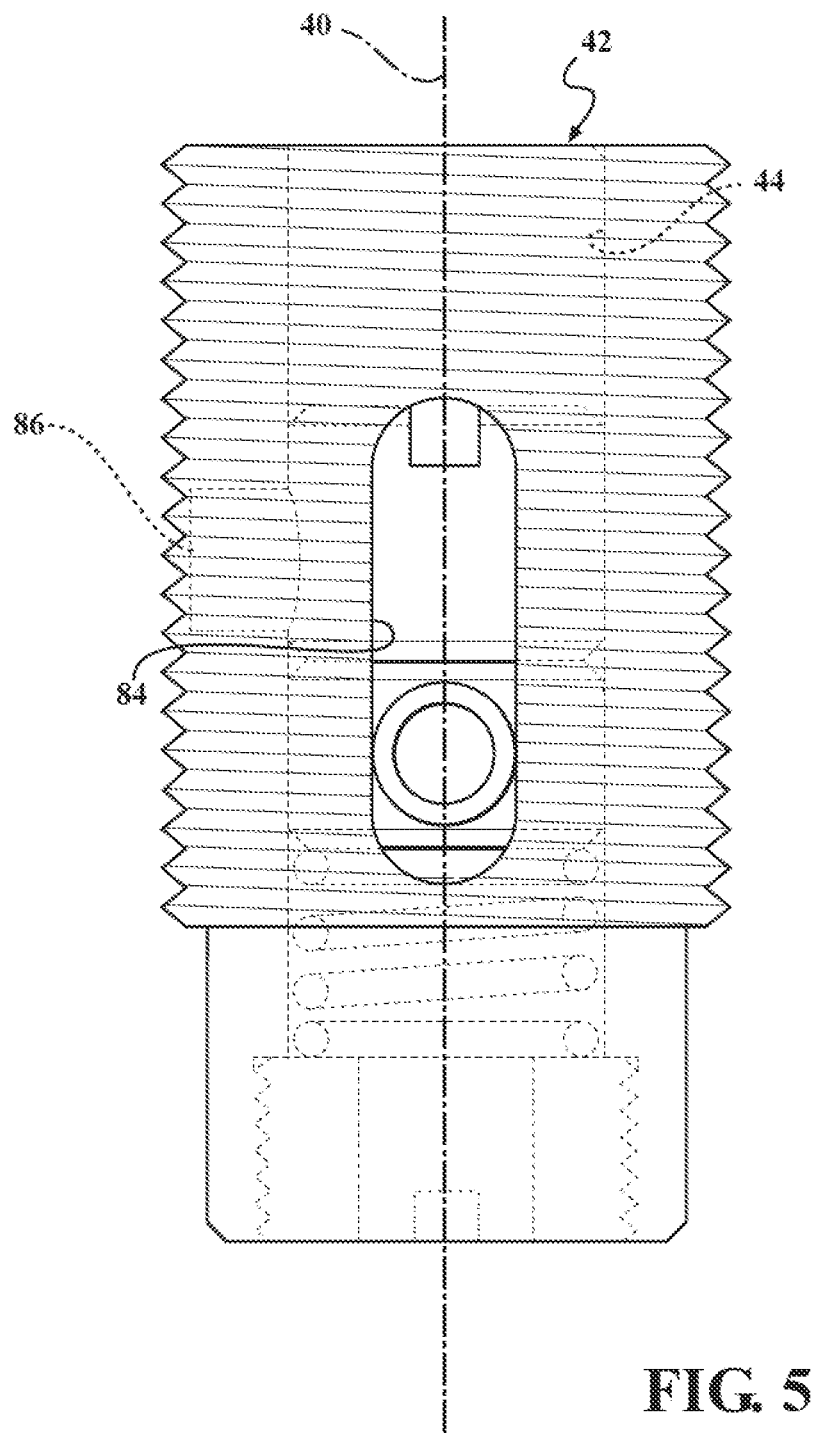
FIG. 5 is a schematic cross sectional view of a housing of the plunger device showing a longitudinal slot therein.

The housing 42 of each of the plunger devices 38 further defines a longitudinal slot 84, shown in FIG. 5. The longitudinal slot 84 extends through the outer wall 66 of the housing 42, and is open to the central bore 44. The longitudinal slot 84 extends along and is parallel with the longitudinal axis 40. The second segment 82 includes a pin 86. The pin 86 extends from the second segment 82 radially outward away from the longitudinal axis 40, and into the longitudinal slot 84. The longitudinal slot 84 guides the pin 86 to move the second segment 82 longitudinally along the longitudinal axis 40 as the piston 50 moves between the raised position and the depressed position. Accordingly, the longitudinal slot 84 prevents the second segment 82 from rotating about the longitudinal axis 40. Therefore, because the first segment 80 rotates freely about the longitudinal axis 40 relative to the second segment 82, rotation of the first segment 80 caused by the spiral shaped cam slot 64 is not transferred to the biasing device 52, i.e., the non-rotatably second segment 82, guided by the interaction between the pin 86 and the longitudinal slot 84, prevents rotation or torque from being transferred from the first segment 80 to the biasing device 52.

Each plunger device 38 further includes a latch 72. The latch 72 may include any device capable of securing the piston 50 in an indicator position, shown in FIG. 4, upon the piston 50 moving from the raised position into the depressed position. The indicator position of the piston 50 is a position axially depressed relative to the raised position. The indicator position may be equal in depth to the depressed position, or as shown in FIG. 4, may be slightly raised relative to the depressed position shown in FIG. 3. As shown in FIG. 4, the latch 72 includes a notch 74 formed in the cam surface. The notch 74 secures an axial position of the piston 50 along the longitudinal axis 40. In operation, the axial force 60 from the stream of the cleaning fluid 28 moves the piston 50 against the biasing force 62 of the biasing device 52 into the depressed position. The depressed position of the piston 50 positions the post 70 axially inline along the longitudinal axis 40 with the notch 74. Cessation of the stream of cleaning fluid 28 disengages the axial force 60 from the piston 50 allowing the biasing force 62 from the biasing device 52 to move the piston 50 axially along the longitudinal axis 40 until the post 70 is disposed within the notch 74, thereby securing the piston 50 in the indicator position.

As shown in FIGS. 2 and 4, the top surface 58 of the piston 50 may define a tool engagement device 76. The tool engagement device 76 is configured for receiving a tool therein. The tool engagement device 76 may include but is not limited to a cross slot for a flathead screwdriver, a cross slot for a phillips screwdriver, or some other configuration suitable for engaging a tool. The tool may be used to depress the piston 50 to release the post 70 from the notch 74. Once the piston 50 is depressed with the post 70 disengaged from the notch 74, the tool may be used to rotate the piston 50 to engage the post 70 with the cam surface, thereby allowing the biasing force 62 from the biasing device 52 to urge the piston 50 into the raised position.

A method of verifying proper functionality of the washing assembly 22 of the part washing system 20 includes positioning the master verification assembly 32 within the washer assembly such that each of the nozzles 26 in the washer assembly is aligned with one of the plunger devices 38 disposed on the master verification assembly 32. The master verification assembly 32 is positioned within the washing assembly 22 with the pistons 50 of all of the plunger devices 38 disposed in the raised position. The master verification assembly 32 may be positioned in the washing assembly 22 in any suitable manner. For example, the master verification assembly 32 may be placed on the conveyor system 24 and fed through the washing assembly 22 in the same manner as the parts to be washed, without interrupting operation of the production line. Alternatively, the master verification assembly 32 may be directly placed and positioned within the washing assembly 22.

Once the master verification assembly 32 is positioned within the washing assembly 22 such that the nozzles 26 are aligned with the plunger devices 38, then the cleaning fluid 28 is dispensed under pressure through each of the nozzles 26. If each nozzle 26 is functioning properly, then the axial force 60 from the stream of the cleaning fluid 28 is directly applied onto the piston 50 of the plunger device 38 aligned therewith, thereby moving the piston 50 of the plunger device 38 aligned with each specific nozzle 26 from the raised position into the depressed position, such as shown in FIG. 3. However, if any of the nozzles 26 are not functioning properly, due to a low dispensing pressure and/or a misaligned nozzle 26 or stream for example, then the axial force 60 from the stream of the cleaning fluid 28 will be insufficient to move the piston 50 of the plunger device 38 aligned therewith from the raised position into the depressed position, and the piston 50 of the plunger device 38 aligned with the malfunctioning nozzle 26 will remain in the raised position, such as shown in FIG. 2.

Once the washing assembly 22 has dispensed the cleaning fluid 28 onto the master verification assembly 32 and the plunger devices 38 therein, then each of the pistons 50 moved into the depressed position by the dispensed cleaning fluid 28 is secured in the indicator position, such as shown in FIG. 4. As described above, the latch 72 secures the piston 50 in the indicator position upon cessation of the axial force 60 from the dispensed cleaning fluid 28.

The method further includes sensing a position of each of the pistons 50. The position of each of the pistons 50 is sensed to determine if the piston 50 is disposed in the raised position, or in the indicator position. Each piston 50 disposed in the indicator position indicates that the nozzle 26 associated with that piston 50 is properly aligned and dispensing cleaning fluid 28 at a proper pressure. Each piston 50 disposed in the raised position indicates that the nozzle 26 associated with that piston 50 is not properly aligned with the piston 50 or is not dispensing the cleaning fluid 28 at the proper pressure. The position of each of the pistons 50 may be sensed in any suitable manner, including but not limited to visually inspecting each of the plunger devices 38 to determine if each of the pistons 50 is in the raised position or in the indicator position, or by electronically sensing the position of each of the pistons 50.

The method further includes identifying which nozzles 26 of the washer assembly 22 are aligned with each of the plunger devices 38 determined to be in the raised position. As noted above, the pistons 50 determined to be in the raised position indicate that the nozzle 26 aligned therewith is not functioning properly. Accordingly, the malfunctioning nozzles 26 are identified so that corrective action may be taken to correct the malfunctioning nozzle 26. The malfunctioning nozzles 26 may be identified in any suitable manner. For example, each of the plunger devices 38 and each of the nozzles 26 may be identified and related to each other through an alpha-numeric code or the like.

Furthermore, if a robotic arm is used to move the part 21 between multiple washing assemblies 22 and/or multiple washing positions, then the above described method may also be used to verify the proper path of the robotic arm. Because the path of the robotic arm is programmed, a change in the part 21, such as the addition of a new port to be washed, may require that the robotic arm be reprogrammed. If one of the plunger devices 38 is not depressed when moved through the part washing system 20, then the robotic path should be verified to ensure that the plunger assembly was in fact positioned axially in-line with the appropriate nozzle 26. As the configuration of the part 21 is modified over time, the start point and the endpoint of the programmed robotic path may be changed, thereby altering the robotic path therebetween. If an error occurs during re-programming of the robotic arm, a feature that was previously washed may be missed. As such, the above described method may also help identify a programming mistake in the robotic path.

Once the master verification assembly 32 has been through the washing assembly 22 and any malfunctioning nozzles 26 have been identified, then the method further includes re-setting any of the plunger devices 38 that are disposed in the indicator position. The pistons 50 are re-set back to the raised position. Re-setting any of the plunger devices 38 may include, for example, depressing the piston 50 while rotating the piston 50 until the piston 50 is released from the latch 72 and the indicator position, and allowing the biasing device 52 to bias the piston 50 back to the raised position. Once the pistons 50 are re-set back into the raised position, the above describe method may be repeated as desired.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of verifying proper functionality of a washing assembly of a part washing system for washing parts along a production line, the method comprising;
   positioning a master verification assembly within the washer assembly such that each of a plurality of nozzles in the washer assembly align with one of a plurality of plunger devices disposed on the master verification assembly;
   dispensing a cleaning fluid under pressure through each of the plurality of nozzles, whereupon each of the plurality of plunger devices includes a piston that is moveable from a raised position into a depressed position in response to an axial force having a magnitude greater than a pre-defined value applied by the dispensed cleaning fluid onto the piston;
   securing each of the pistons moved into the depressed position by the dispensed cleaning fluid in an indicator position;
   sensing a position of each of the pistons to determine if the piston is disposed in the raised position or in the indicator position, wherein each piston disposed in the indicator position indicates that the nozzle associated with that piston is properly aligned and dispensing cleaning fluid at a proper pressure, and wherein each piston disposed in the raised position indicates that the nozzle associated with that piston is not properly aligned with the piston or is not dispensing the cleaning fluid at the proper pressure.

2. A method as set forth in claim 1 wherein sensing a position of each of the pistons includes removing the master verification assembly from the washer assembly.

3. A method as set forth in claim 2 wherein sensing a position of each of the pistons includes visually inspecting each of the plurality of plunger devices to determine if each of the pistons is in the raised position or in the indicator position.

4. A method as set forth in claim 3 further comprising identifying which of the plurality of nozzles of the washer assembly are aligned with each of the plurality of plunger devices determined to be in the raised position.

5. A method as set forth in claim 2 further comprising re-setting any of the plurality of plunger devices that are disposed in the indicator position to the raised position.

6. A method as set forth in claim 5 wherein re-setting any of the plurality of plunger devices that are disposed in the indicator position to the raised position includes depressing the piston while rotating the piston until the piston is released from the indicator position.

7. A method of verifying proper functionality of a washing assembly of a part washing system for washing parts along a production line, the method comprising;
   positioning a master verification assembly within the washer assembly such that each of a plurality of nozzles in the washer assembly align with one of a plurality of plunger devices disposed on the master verification assembly;
   dispensing a cleaning fluid under pressure through each of the plurality of nozzles, whereupon each of the plurality of plunger devices includes a piston that is moveable from a raised position into a depressed position in response to an axial force having a magnitude greater than a pre-defined value applied by the dispensed cleaning fluid onto the piston; and
   sensing a position of each of the pistons to determine if the piston is disposed in a raised position or in an indicator position, wherein each piston disposed in the indicator position indicates that the nozzle associated with that piston is properly aligned and dispensing cleaning fluid at a proper pressure, and wherein each piston disposed in the raised position indicates that the nozzle associated with that piston is not properly aligned with the piston or is not dispensing the cleaning fluid at the proper pressure.

8. The method set forth in claim 7 further comprising securing each of the pistons moved into the depressed position by the dispensed cleaning fluid in the indicator position.

9. The method set forth in claim 8 wherein sensing a position of each of the pistons includes removing the master verification as assembly from the washer assembly.

10. A method as set forth in claim 9 wherein sensing a position of each of the pistons includes visually inspecting each of the plurality of plunger devices to determine if each of the pistons is in the raised position or in the indicator position.

11. A method as set forth in claim 10 further comprising identifying which of the plurality of nozzles of the washer assembly are aligned with each of the plurality of plunger devices determined to be in the raised position.

12. A method as set forth in claim 11 further comprising re-setting any of the plurality of plunger devices that are disposed in the indicator position to the raised position.

13. A method as set forth in claim 12 wherein re-setting any of the plurality of plunger devices that are disposed in the indicator position to the raised position includes depressing the piston while rotating the piston until the piston is released from the indicator position.

\* \* \* \* \*